Nov. 4, 1952  H. RINIA ET AL  2,616,251
APPARATUS FOR CONTROLLING THE POWER OF HOT-GAS MOTORS
Filed Sept. 5, 1945  2 SHEETS—SHEET 1
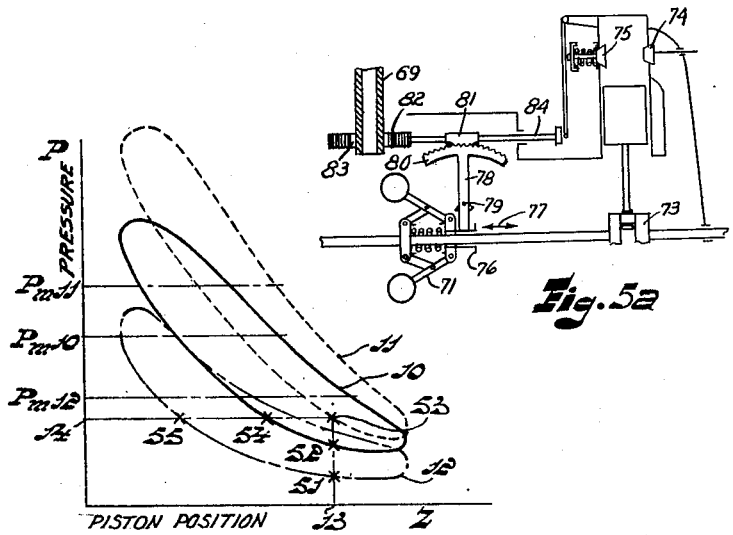
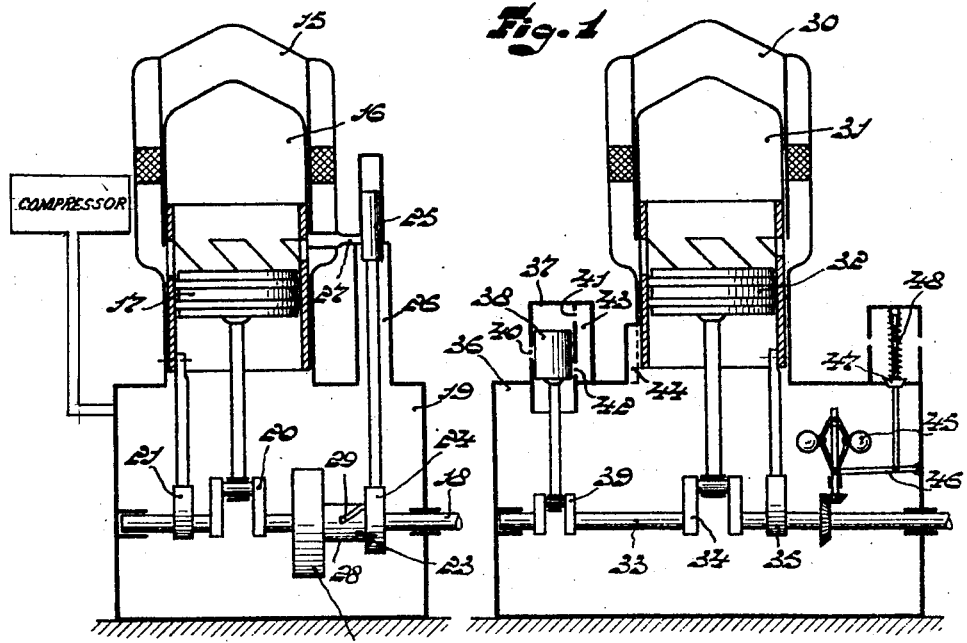
INVENTORS
HERRE RINIA,
HEINRICH DE BREY &
WILLEM JAN VAN HEECKEREN
BY
ATTORNEY Nov. 4, 1952    H. RINIA ET AL    2,616,251
APPARATUS FOR CONTROLLING THE POWER OF HOT-GAS MOTORS
Filed Sept. 5, 1945    2 SHEETS—SHEET 2
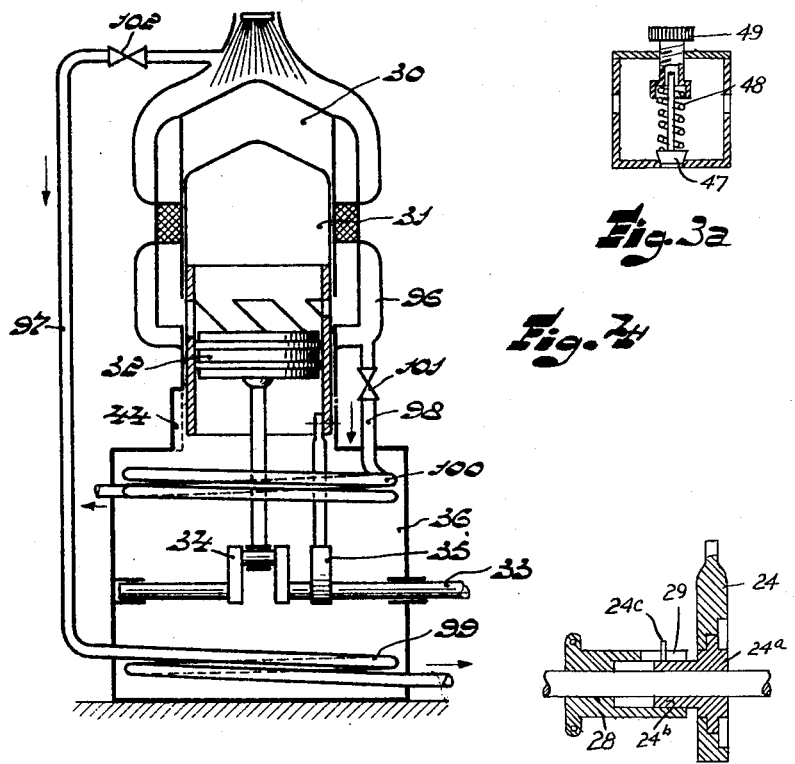
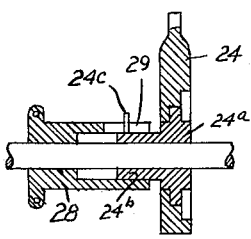
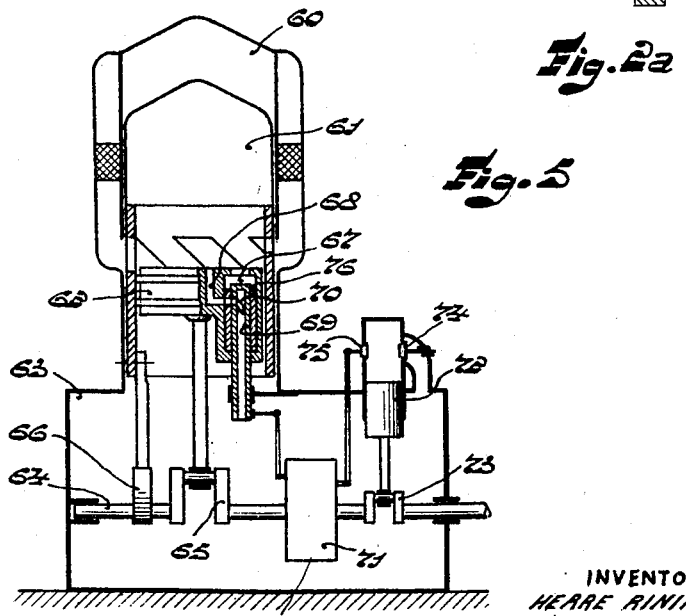
INVENTORS
HEARE RINIA,
HEINRICH DE BREY &
WILLEM JAN VAN HEECKEREN
BY
ATTORNEY Patented Nov. 4, 1952

2,616,251

UNITED STATES PATENT OFFICE 2,616,251

APPARATUS FOR CONTROLLING THE POWER OF HOT-GAS MOTORS

Herre Rinia, Heinrich de Brey, and Willem Jan van Heeckeren, Eindhoven, Netherlands, assignors to Hartford National Bank & Trust Co., Hartford, Conn., as trustee Application September 5, 1945, Serial No. 614,573
In the Netherlands August 25, 1943

Section 1, Public Law 690, August 8, 1946
Patent expires August 25, 1963

5 Claims. (Cl. 60—24)

This invention relates to means for and a method of controlling the indicated power of a hot-gas engine.

In the present case a hot-gas engine is to be understood to mean a mechanism for converting caloric heat into mechanical work. In hot-gas engines a quantity of gas in enclosed above a piston in a cylinder. By displacing another piston located either in the first-mentioned space or in a second space freely communicating therewith this gas is supplied to a heater in which its temperature rises, as a result of which the pressure of the gas increases. As the pressure of this gas increases, it actuates two intercoupled pistons, expands and thus performs work. Owing to expansion the gas is cooled and upon a further movement of the pistons the gas flows through a cooler in which the remaining heat is given off. The cooled gas is compressed and the cyclic process is repeated. Between the heater and the cooler a regenerator is generally provided in which part of the heat of the gas flowing out of the heater is absorbed. When the gas flows back, this heat is returned to it again so that it is not lost for the working process in the cooler.

According to a proposed method of controlling the engine power by varying the quantity of the circulating medium, a separate chamber having a variable volume is constantly kept in open communication with the cylinder during the control. Such a control, however, affects the engine power during this control operation, because the gas flows to and fro in a junction duct between the cylinder of the motor and this separate chamber. This involves flow losses in the circulating medium, which reduce the engine power. Moreover, the volume above the piston is increased during the control by the volume of the added separate chamber. Since the stroke volume of the piston remains the same, the ratio of compression decreases temporarily, due to which the efficiency also falls off.

A principal object of this invention is to provide means for controlling the power of a hot-gas engine.

Another object of this invention is to provide a hot-gas engine having control means for regulating the power of the same with a minimum loss of efficiency during such control.

Still another object of this invention is to provide means for controlling the power output of hot-gas engines without the previous objections to such power control.

Further objects and features of this invention will become apparent as the description of the invention proceeds hereinafter.

In the drawing:

Fig. 1 is a diagram of the pressure variation in the cylinder of the subject hot-gas engine during a complete revolution of its crankshaft for definite ranges of power;

Fig. 2 is a vertical schematic view including a partial vertical sectional view of a piston displacer of a hot-gas engine employing one embodiment of a power control for the same;

Fig. 3 is a similar view of a hot-gas engine showing another embodiment of a power control for the same;

Fig. 4 is another embodiment of the inventive concept in a drawing view similar to Figs. 2 and 3; and Fig. 5 is still another embodiment of the present invention in a drawing view similar to Fig. 4 and incorporating a regulator within the power control for the subject engine.

According to the present invention power control takes place in such a manner that equalization between the pressure of the medium participating in the cycle and of a separate quantity of medium available for the control takes place per cycle only during such a short time that with a substantially constant ratio of compression the quantity of medium taking part in the cycle is varied. If an equalization of pressure of short duration takes place with a pressure exceeding the pressure prevailing in the cycle at that moment, a certain quantity of medium will flow into the cylinder of the motor per full cycle. The pressure is on a higher level during the whole process of equalization and the indicated motor power increases. Inversely, by making the contents of the cylinder communicate with a lower pressure than that prevailing in the cylinder at that moment the pressure during the whole cycle is lowered and due to this the motor power would fall off. The reciprocating flow of medium through a junction duct, produces variations of the ratio of compression in the cylinder, but losses of flow resulting therefrom are avoided, since this communication lasts only for such a short time that during this short control time the pressure in the cylinder undergoes no change solely on account of the movement of the piston. To obtain the required power variation, the communication between the cylinder and the source of higher or lower pressure, as the case may be, is repeated periodically, i. e. during every succeeding cycle until the required change is secured. The invention yields a smooth power control, since the change in pressure in a cylinder per cycle, i. e. per complete revolution of the crankshaft, needs only be slight, and as long as the control takes place, differs only slightly with every succeeding cycle, from the change in the preceding cycle. However, a rapid control is possible by making use of a moment at which a great pressure difference prevails between the pressure in the cylinder and the available control pressure, so that a large quantity of the medium is supplied or carried off per cycle.

The control according to the invention can be realized in various ways. The pressure available for the control may be kept constant. In this case the moment at which equalization of pressure takes place, is varied. During a complete cycle in the cylinder, i. e. during a complete revolution of the crankshaft, the pressure in the cylinder changes twice between the minimum and the maximum value. If at the moment, at which equalization can take place, the available control pressure is different from the pressure in the cylinder, control of the engine power takes place. If the two pressures are exactly equal at this moment, no flow of gas occurs in spite of a free communication existing between the cylinder and another chamber. Consequently, power losses due to gas flow are excluded in the case of the control not being operative.

According to another embodiment of the invention power control takes place at a moment which is invariable with respect to a variation of pressure in the cylinder produced with the aid of a controllable and variable pressure. The effect of this control method and its advantages are quite equal to those of the control method set out above.

Finally, the two control methods may be used jointly by varying both the control pressure and the moment of control with respect to the pressure in the cylinder. Generally speaking a larger control range is achieved in this way.

The hot-gas engine in which the method of control according to the invention may be used, comprises the usual cylinder or cylinders and in addition another chamber which communicates through duct means with the cylinder or cylinders. These duct means include closing means which operate periodically and open the duct only for a short time. According to whether the control takes place with a fixed pressure at a variable moment or with a variable pressure at a fixed moment with respect to the cycle, the moment of opening and closing of this duct or the pressure in this other chamber with respect to the variation of pressure in the cylinder can be varied. If these two factors participate in the control both the moment of opening and closing of the channel and the pressure in the other space are variable.

In order that the invention may be clearly understood and readily carried into effect, it will now be explained more fully with reference to the accompanying drawings in which some forms of construction are represented by way of example only. It should be understood that the invention is not limited to the types of hot-gas engines shown.

Referring to Fig. 1 the various curves show diagrams of the pressure variation in the cylinder, in accordance with the position of the piston for different indicated powers. The full line 10 represents the diagram for the average power. In this case the average pressure in the cylinder is $pm_{10}$. This average pressure, jointly with the speed of the motor, determines the indicated power. For a higher power the diagram has, for example, the form of the dotted line 11, from which follows an average pressure of $Pm_{11}$. For a lower power the diagram varies, for example, according to the dot and dash line 12 indicating an average pressure of $Pm_{12}$. In these different cases it is assumed that the pressure ratio of the diagram, i. e. the ratio between the lowest pressure and the highest pressure in a diagram remains equal for all of the three cases.

The control of the indicated power occurs by gradually passing from one diagram to the other in the manner set out hereinafter.

At a definite moment of the pressure cycle in the cylinder, denoted by the point 13 on the abscissa, the cylinder is made to communicate with another space containing a suitable medium for bringing the motor down to or up to a definite pressure as the case may be. If, for example, this pressure corresponds with that at 51 and the engine operates during this revolution of the crankshaft according to diagram 10, the pressure at 52 will fall off with each revolution of the crankshaft, when the piston has arrived at 13, until this pressure gradually reaches that at 51. The speed at which this takes place depends on the prevailing pressure difference between the cylinder, when the piston is at 13, and depends on the pressure in the other space and in addition on the size of the opening which is formed between the cylinder and this other space.

If, on the contrary, instead of a low pressure 51 an increased pressure 53 is applied at 13 the level of the whole diagram will gradually rise to diagram 11. This control takes place by means of a variable pressure source which is applied at a fixed point 13 of the pressure variation in the cylinder.

The engine power control can also be realized with the aid of a constant available pressure, provided that the moment at which this pressure can be distributed to the engine cylinder is shifted with respect to the cyclic variation of pressure in this cylinder. If a constant pressure 14 is available, it likewise permits the power to be controlled. In fact, if the moment at which the cylinder is made to communicate with the other chamber is shifted from 53 in diagram 11 to 54 in diagram 10 or to 55 in diagram 12, this constant pressure occurs at different points in diagram 12 so that diagrams having a different average pressure are obtained.

Finally, the two aforesaid control methods may be combined by varying both the available pressure and the point of control, which permits a larger control range. Of course a variation of the indicated power solely takes place when the control pressure and the moment of control are not changed in the same sense, i. e. when the available control pressure does not correspond with the pressure in the cycle prevailing at the point of control.

Fig. 2 shows a form of construction of a hot-gas motor in which the control set out above may be used.

In a cylinder 15 are movable both a displacer piston 16 and a working piston 17. Both pistons are driven from a common crankshaft 18, the piston 17 by means of a crank 20 and the displacer 16 by means of an eccentric 21. A crank chamber 19 constructed in a gas-tight manner serves as a container for a control gas which is maintained at a constant pressure by any suitable means, such as a compressor 110. In this embodiment the control takes place with a fixed pressure which is created in the cylinder 15 at a time point variable with respect to the pressure cycle in the cylinder. Between the cylinder 15 and the crank case 19 there is provided duct or junction means in the form of 90° joined ducts 26 and 27 respectively. The duct means are intermittently closed at the junction by means of a small piston valve 25 operating periodically while driven by means of an eccentric 24 on the crankshaft 18. The movement of this piston 25 with respect to the duct 27 is such that only in the extreme upper position of the piston 25 will the duct 27 communicate during a very short time with the duct 26. During the further remaining phases of the movement of the piston 25 the communication between the channels or ducts 26 and 27 is continuously interrupted when the engine condition indicates a necessity of control. At the moment at which the piston 25 is in its extreme upper position, a pressure difference, if any, between the contents of the cylinder 15 and those of the crank case 19 can be equalized through the ducts 26 and 27. This moment is made variable, however, with respect to the pressure cycle in the cylinder 15 i. e., with respect to the movements of the piston 17 by changing the position of the eccentric 24 with respect to the crankshaft 18. As seen in Fig. 2a this eccentric is provided on a known so-called Dutch sliding bush 23 which comprises an eccentric 24 provided with an inner ring 24a having a bushing 24b. Bushing 24b has a pin 24c which is adapted to fit in helical groove 29 of the sleeve 28. Said sleeve 28 is similar to and operates in substantially the same manner as bushing 76 (Fig. 5a) which will hereinafter be more particularly explained. If sleeve 28 is moved in a lateral direction, the inner ring 24a is rotated over a certain angle due to the helical form of the groove 29, thus altering the eccentricity of eccentric 24. Consequently this regulator 22 is capable of varying the angle between the crank 20 and the eccentric 24, so that the point, at which the control of the motor power takes place, is variable with respect to the movement of the piston.

If the indicated power is in equilibrium with the required work performed by the engine, the regulator 22 is at rest i. e. that is in the course of every cycle the transient communication between the crank case 19 and the cylinder 15 is always established at the same moment. However, since the pressures are equal at that moment, no flow of the gaseous medium takes place in the ducts 26 and 27, so that the indicated motor-power is not changed either. A disturbance of this equilibrium by a change of the external load involves a speed variation of the crankshaft, due to which the regulator 22 becomes operative and the moment, at which the communication between the cylinder 15 and the crank case 19 is established, changes as well. In this case the medium can be supplied or carried off from the cylinder, so that the indicated power is adapted to the required external load.

Fig. 3 shows a hot-gas engine in which the power control is effected by connecting the cylinder periodically during a fixed point of the pressure cycle to a space or volume having a variable pressure. The hot-gas engine consists of a cylinder 30 in which the piston 32 and the displacer 31 move. The piston and the displacer are driven from a joint or common crankshaft 33 viz, the piston through a crank 34 and the displacer through an eccentric 35. The crank case 36 is shut off from the open air and constitutes a separate space which in this case is used to store gas having such a pressure as is required for the control of the power. To this end a compressor 37 is incorporated in the crank case; the piston 38 of this compressor being driven by means of a separate crank 39 directly from the crankshaft 33. The compressor 37 is of the valveless type, i. e. the piston 38 itself closes apertures for a suitable operation of the compressor and lets them free. The aspiration of the air occurs through the aperture 40 when the piston 38 is in its lowest position. The space above the piston is then filled with air of 1 atm. In this case there is no communication with the crank case, as the lower aperture 42 remains closed in the lowest position of the piston 38. Upon the next movement of the piston the air in the cylinder of the compressor is compressed and then flows, through the aperture 41, into a side duct 43. At the end of the piston stroke, in the upper position, the aperture 42 is left free, so that the compressed air flows out of the duct 43 into the crank case 36. Consequently this compresses or regularly increases the pressure in the crank case.

The crankshaft 33 has also coupled to it a regulator 45 which controls, by means of a lever 46, a valve 47 opening to the outside, and being located in the wall of the crank case. This valve 47 is kept closed by a spring 48 as long as the regulator 45 jointly with the pressure in the crank case do not exert a greater force than this spring. In the case of an increasing speed of the crankshaft 33, the force exerted by the regulator 45 via the lever 46 on the valve 47 increases, so that the valve opens and the pressure in the crank case falls off. If the speed of the crankshaft 33 decreases, the valve remains closed so that the compressor 37 steadily raises the pressure in the crank case.

The periodic communication between this chamber and the cylinder 30 takes place through circulation duct 44 which is located in such a manner with respect to the movement of the piston that only in the lowest position of the piston 32 a communication exists between the cylinder 30 and the crank case 36. Consequently the pressure in the crank case is made to communicate with the pressure in the cylinder always at a fixed point of the pressure cycle, in this case at one end of the piston stroke, so that the control takes place when these pressures are not equal. Instead of the automatically operating regulator 45, the spring 48 of the valve 47 may be directly acted upon by a manually operated lever if an automatic control of the speed in accordance with the power is not required. Such a simple hand control may, for example, be used for marine motors, and is more particularly seen in Fig. 3a. The spring 48 operates between the valve 47 and the adjusting screw 49. By turning the adjusting screw, tension on the spring 48 may be altered and also the pressure in the crank case may be altered. If the pressure in the crank case rises above a certain level the valve 47 is opened and the working medium escapes.

Fig. 4 represents a hot-gas engine, in which the control of the pressure takes place in a simple manner in a chamber other than the cylinder of the motor. This other chamber which if formed by the closed crank case 36, communicates with the cylinder of the motor through the circulation duct 44, such as is the case in the form of construction shown in Fig. 3. In this form of construction the variation of the gas pressure in the crank case 36 is obtained by changing the temperature of this gas. For this purpose the crank case comprises both a heating spiral 99 and a cooling spiral 100. The heating spiral 99 communicates with a duct used for the combustion gases associated with the heater of the motor through a duct 97 including a valve 102. If an increase of the indicated motor power is required, the valve 102 is opened. A part of the combustion gases from the heater flows through the duct 97 to the heating spiral 99 and then either to the open air or to a chimney, or to other members to be heated. The heating spiral 99 transfers the heat from the combustion gases to the gas in the crank case 36 whose temperature and pressure increase as a result thereof. When the piston 32 in its lower position establishes a communication between the crank case 36 and the cylinder 30, a part of the gas flows to the cylinder. A decrease in engine power by a reduction of the pressure in the crank case may take place by putting the heating spiral 99 out of action and by actuating the cooling spiral 100. By means of a duct 98 this cooling spiral is connected to the cooler 96. A valve 101 in this duct permits the cooling spiral to be put in or out of action at will. The cooling medium flowing through the spiral 100 may, for instance, be supplied again to the cooling system of the motor at another point.

Fig. 5 represents a form of construction of a hot-gas engine, in which both the control pressure and the point of control are variable with respect to the pressure cycle in the cylinder. In a cylinder 60, a diplacer 61 and a piston 62 are movable. The displacer is driven from a crankshaft 64 by means of an eccentric 66 and the piston from the same crankshaft by means of a crank 65. The crankshaft 64 is housed in a crank case 63 which is shut off from the atmosphere and functions as a chamber in which a variable pressure may prevail.

A periodic communication between the crank case 63 and the cylinder 60 is established by means of a tube 69, which empties in the crank case at one end and is movable in a bore 67 of the piston at the other end. This tube 69 is stationary with respect to the crank case 63, so that the piston 62, when moving moves about the tube 69. The tube 69 is closed at the end extending in the piston and exhibits a lateral helical aperture 70 which may register with the end of a right-angled bore 68 in the body of the piston. By turning the tube 69 about its longitudinal axis, it is possible to vary the moment at which the end of the right-angled bore 68 is located opposite a part of the helical slot 70, i. e. the moment at which the crank case 63 communicates with the cylinder 60. Such a communication would ordinarily take place twice each revolution of crankshaft 64, that is, once during the down stroke and once during the up stroke of piston 62 at a predetermined distance from the lower dead center point of the piston. However by means of a loose bushing 76, which is slidable in the bore 67 between the upper and lower limits thereof, the aperture 70 is closed during the downward stroke of the piston so that the communication is established at a point only during the upward stroke of the piston. The point of opening may be varied by turning of the tube 69 which may be affected entirely automatically, in accordance with the power to be delivered by means of a regulator 71 which is directly mounted on the crankshaft 64. Thus, if the piston 62 moves in an upward direction, the loose bushing 76 is in its lowermost position due to the acceleration of the piston at the end of the upward movement of the piston. However, this movement slows down and due to this fact the bushing slides in an upward direction thereby causing aperture 70 to close. During the first part of the downward movement of the piston 62 the bushing is still in its upward position, but at the conclusion of the downward movement of the piston the bushing slides in its original lowermost position.

Referring more particularly to the regulator 71 as seen in Fig. 5a, the regulator is of a conventional type and is provided with a bushing 76 which can slide in directions indicated by arrow 77. A lever 78 is adapted to pivot about fixed point 79, the lever being provided with a pinion in the form of a gear segment 80. By moving gear segment 80 the rack 81 is moved. A second rack 82 is connected to rack 81 and moves therewith. Rack 82 is operatively connected to pinion 83 of the tube 69. Also connected to rack 81 is a rod 84 by which the valve 75 may be opened.

In order to vary the pressure in the crank case the said crank case has a compressor built therein. The compressor is driven from the crankshaft 64 by a crank 73. This compressor is equipped with two valves 74 and 75 opening and closing under the action of the air pressure. The valve 75 shutting off the contents of the compressor cylinder from the open air is, moreover, acted upon by the regulator 71 and this in such a manner that this regulator is capable of opening the valve 75 constantly, which means, consequently, that in this case the compressor is put out of action.

Consequently, for the control of the engine power by means of a regulator 71 both the point at which the pressure is made to communicate with the pressure cycle in the cylinder and the value of this pressure can be controlled by turning the tube 69 and by varying the pressure in the crank case as a result of putting the compressor in or out of action. However, the power may controllably be reduced by the sole operation of turning the tube 69, if the crank case is vented to atmosphere.

What we claim is:

1. A hot gas engine operating with a given cycle comprising a cylinder adapted to receive a working gas, a crankshaft, a piston in said cylinder and forming therewith a working space for said gas, a container adapted to receive a control gas, means to pressurize the control gas, means to periodically connect said working space and container during a portion of each cycle, and means to vary the amount of gas passing between said working space and container and thereby vary the indicated power of the engine, said latter means being responsive to the speed of the engine and being coupled to at least one of said first two means.

2. A hot-gas engine comprising cylinder means, pressurized chamber means, duct means between said respective means, valve means for said duct means, and means coupled to said valve means responsive to engine speed changes for periodically opening said duct means for a momentary time with respect to the time for each cycle of operation of said engine at variable points of the engine cycles.

3. A hot gas engine operating with a given cycle comprising a cylinder adapted to receive a working gas, a crankshaft, a piston in said cylinder and forming therewith a working space for said gas, a container adapted to receive a control gas, means to pressurize the control gas, means including a valve to periodically connect said working space and container during a portion of each cycle, and means to vary the amount of gas passing between said working space and container and thereby vary the indicated power of the engine, said latter means being responsive to the speed of the engine and being coupled to said connecting means to control the time of opening of said valve.

4. A hot gas engine operating with a given cycle comprising a cylinder adapted to receive a working gas, a crankshaft, a piston in said cylinder and forming therewith a working space for said gas, a container adapted to receive a control gas, means to pressurize the control gas, means to periodically connect said working space and container during a portion of each cycle, and means to vary the amount of gas passing between said working space and container and thereby vary the indicated power of the engine, said latter means being responsive to the speed of the engine and being coupled to said pressurizing means to vary the pressure of the control gas.

5. A hot gas engine operating with a given cycle comprising a cylinder adapted to receive a working gas, a crankshaft, a piston in said cylinder and forming therewith a working space for said gas, a container adapted to receive a control gas, means to pressurize the control gas, means including a valve to periodically connect said working space and container during a portion of each cycle, and means to vary the amount of gas passing between said working space and container and thereby vary the indicated power of the engine, said latter means being responsive to the speed of the engine and being coupled to said pressurizing means and said connecting means to vary the pressure of said control gas and the time of opening of said valve.

HERRE RINIA.
HEINRICH DE BREY.
WILLEM JAN VAN HEECKEREN.

REFERENCES CITED

The following references are of record in the file of this patent:

UNITED STATES PATENTS

| Number | Name | Date |
|---|---|---|
| 345,450 | Rider | July 13, 1886 |
| 716,036 | Heil | Dec. 16, 1902 |
| 2,547,781 | Rinia et al. | Apr. 3, 1951 |

FOREIGN PATENTS

| Number | Country | Date |
|---|---|---|
| 197,962 | Great Britain | Sept. 22, 1924 |
| 26,656 | Germany | Apr. 23, 1884 |